United States Patent [19]
Rothert et al.

[11] 3,761,059
[45] Sept. 25, 1973

[54] PROCESSING APPARATUS

[75] Inventors: Horst Rothert; Wolf Karasiak, both of Berlin, Germany

[73] Assignee: The Firestone Tire & Rubber Company, Akron, Ohio

[22] Filed: Sept. 28, 1971

[21] Appl. No.: 184,424

[30] Foreign Application Priority Data
Mar. 19, 1971  Germany.................. P 21 14 080.7

[52] U.S. Cl. .................... 259/9, 159/11 B, 261/92
[51] Int. Cl. ....................... G08c 35/00, B01f 7/10
[58] Field of Search ............... 259/9, 10, 45, 46, 259/68, 69; 159/11 B; 261/92; 416/197, 228, 416/231

[56] References Cited
UNITED STATES PATENTS

| | | | |
|---|---|---|---|
| 3,684,458 | 8/1972 | McCammon et al. ............ | 259/10 X |
| 3,617,225 | 11/1971 | Kuehne et al. .................... | 259/10 X |
| 3,248,180 | 4/1966 | Kilpatrick .......................... | 259/9 X |
| 3,630,688 | 12/1971 | Takiguchi et al. ................. | 259/10 X |
| 3,591,344 | 7/1971 | Schnock et al. ................... | 259/9 X |
| 3,279,895 | 10/1966 | Howe ................................. | 259/25 X |
| 2,869,838 | 1/1959 | Ryder ................................. | 259/9 |
| 3,266,784 | 8/1966 | Saito .................................. | 261/92 X |

Primary Examiner—John Petrakes
Assistant Examiner—Alan I. Cantor
Attorney—George H. Spencer et al.

[57] ABSTRACT

Flowable material is mixed and forwarded through a processing apparatus by means of a rotating structure having an array of annular discoidal members coaxially mounted thereon to rotate therewith. The annular discoidal members are inclined away from normality ot the axis of rotation, and the most rearward points of the peripheries of the successive discs are disposed along a helicoidal line coaxial with the rotation of the structure, which disposition of the discs causes the structure as a whole to emulate the action of a screw in that the flowable material is propelled through the apparatus. When the depth of flowable material in the apparatus is regulated such that it approximately equals the annular width of the discs, veils of flowable material continually fall from the rotating discs, for example to promote chemical reactions.

17 Claims, 14 Drawing Figures

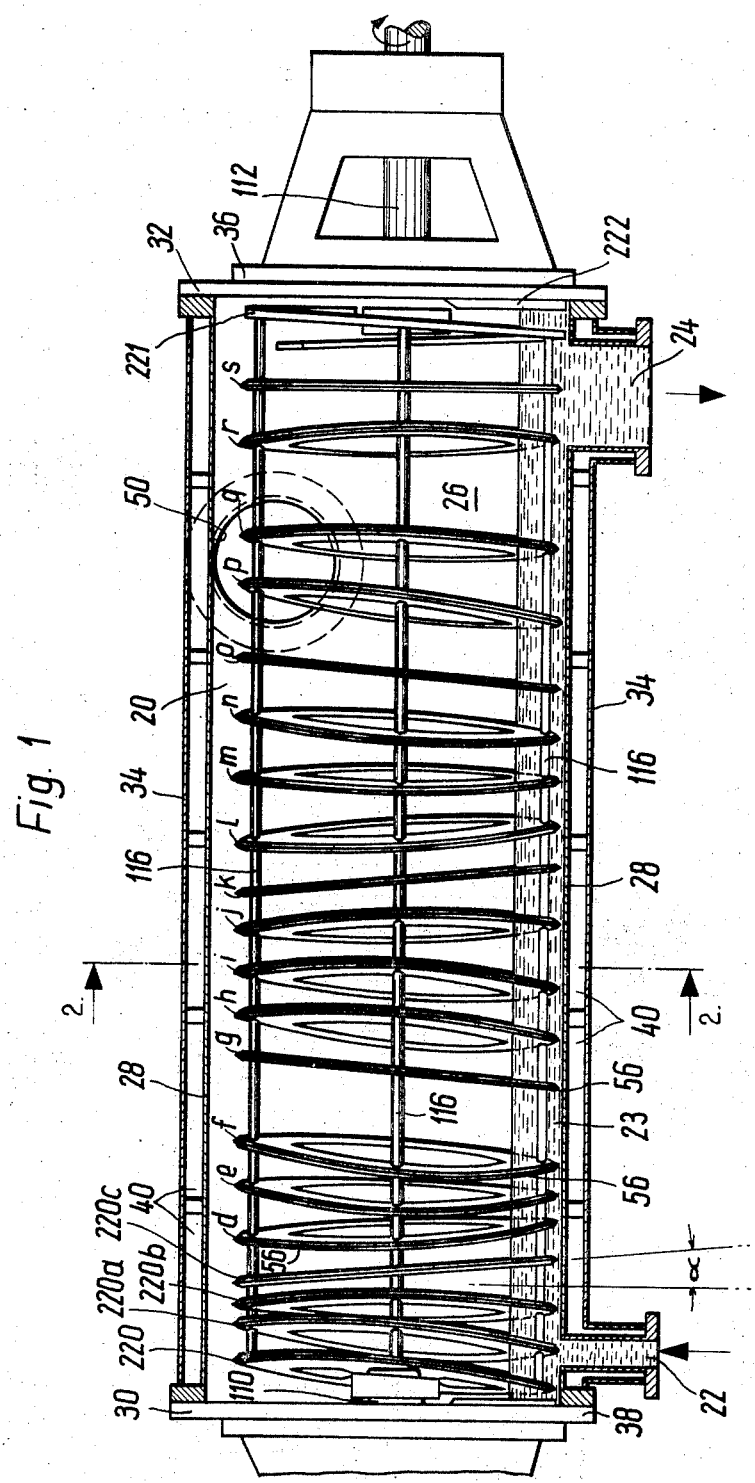

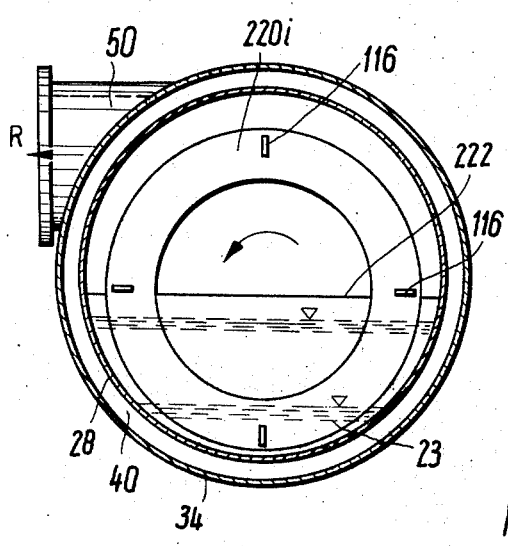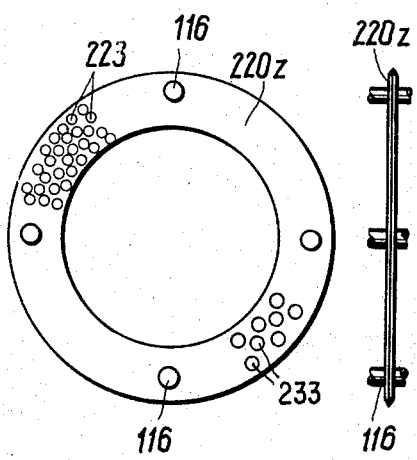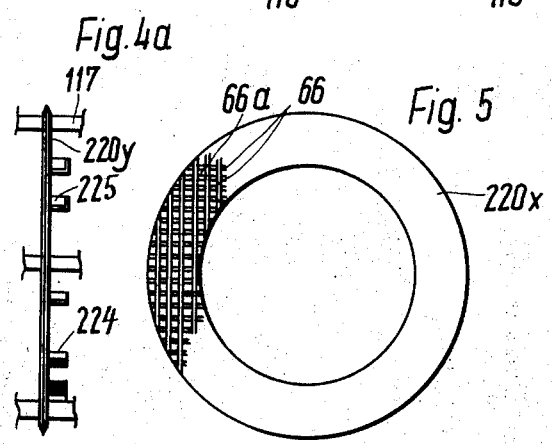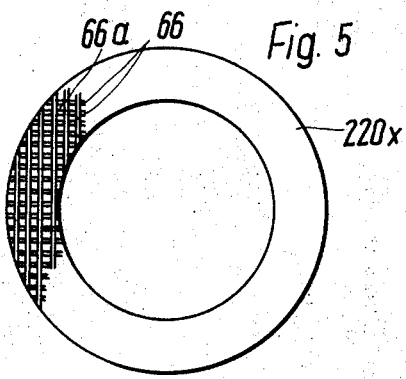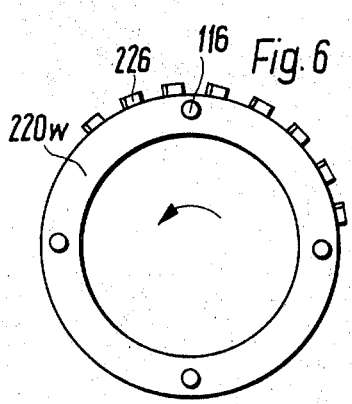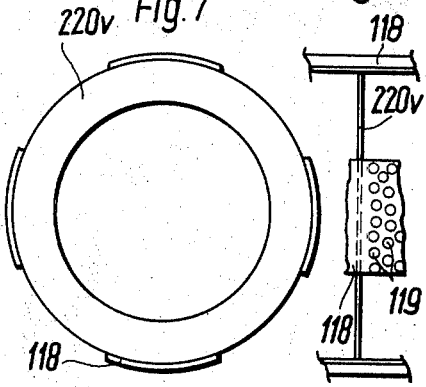

PROCESSING APPARATUS

CROSS-REFERENCE TO RELATED APPLICATION

The subject matter of this application is related to that disclosed in application Ser. No. 1,419 filed Jan. 8, 1970, by William L. McCammon and George E. Bishop for a "Propulsion and Processing Apparatus for Flowable Materials" now U.S. Pat. No. 3,684,458.

BACKGROUND OF THE INVENTION

The present invention relates to apparatus and method for the carrying out of mixing, reacting, and propelling of flowable materials.

The present invention represents an improvement of the invention described in the above-mentioned U.S. Pat. No. 3,684,458. As described in that application, an apparatus for the treatment of flowable materials includes a reactor housing with an inlet at one end and an outlet at its other end, and a means rotatable about a horizontal axis for the mixing and forwarding of flowable materials. The apparatus may be used for the polycondensation of prepolymers (liquid intermediate resins) to polyesters with high molecular weights. The rotatable mixing and forwarding means is made of discoidal members arranged one after the other in the direction of the rotational axis. The discs are each individually tilted in such a manner that the point on the periphery of each lying closest to a given end of the reactor housing lies on a helicoidal line coaxial with the axis of rotation. The discs are furthermore attached solely at their peripheries to a cage structure extending between two coaxial stub-shafts.

The apparatus described in the above-mentioned patent to McCammon et al. enables not only the agitation, for instance mixing, of flowable material, but in addition the forwarding of the material in a reactor. The structure of the apparatus is yet extremely simple, and it is thus easy to manufacture. The apparatus can be adapted to a variety of applications.

SUMMARY OF THE INVENTION

It is an object of the present invention to develop and improve the above-described apparatus of McCammon et al in an especially advantageous manner whereby, for example, the polycondensation of prepolymers to polyesters of high molecular weight is considerably improved and accelerated.

This as well as other objects which will become apparent in the discussion that follows are achieved, according to the present invention by forming the discs of the apparatus of McCammon et al. as annular discs. In the method of the present invention, the annular width of the discs is approximately equal to the immersion depth of the annular discs in the flowable material.

GENERAL ASPECTS OF THE INVENTION

As in the apparatus of McCammon et al, there is in the present invention a rotary carrier in the form of a cage having a row of substantially planar discoidal propulsion members mounted thereon to rotate therewith, the centers of the discoidal members being substantially at the axis of rotation of the carrier so that each discoidal member symmetrically surrounds that axis. Each of the discoidal members is inclined somewhat (say 1.5° – 45°, and preferably 2° –20°) away from being normal or perpendicular in relation to the axis of rotation, so that one point, hereinafter designated the "trailing point," of the periphery of that member is closer to the intake end of the apparatus than any other point. The trailing points of the successive members are disposed along a line which is generally helicoidal, with the axis of the helicoidal line being substantially coaxial with the axis of rotation of the carrier. As pointed out in the patent to McCammon et al., such a structure will propel a flowable mass along the direction of the axis of rotation in the same direction as would a conventional worm conveyor having the same sense of rotation and a helix of the same sense (left- or right-hand) as the helicoidal line of the trailing points of the discoidal members.

The essential advantage of the present invention is to be seen in the fact that, without impairment of the agitating and forwarding action as achieved by McCammon et al new flowable material clings to a given element of a disc of each rotation and is consequently lifted upwards out of the bath of flowable material in the bottom of the reactor housing. Due to the absence of the central structure of McCammon et al., because the discoidal members in the present invention are annular discs, that is, they have a continuous and unobstructed central opening, the entire surface area of a discoidal member is wetted by the flowable material during the course of one complete rotation when the annular width of the discoidal member equals the immersion depth of the discoidal member into the flowable material. The level of the flowable material can lie higher than the annular width of the discoidal member. Also, it can lie lower. When the level is below the inner edge of an annular discoidal member according to the invention, the parts of the discoidal member which are not wetted directly by immersion do nevertheless eventually become wetted, by streaks of flowable material flowing out of disc surface regions which do get directly wetted. The streaks and likewise the clinging flowable material acquired in full direct wetting of a discoidal member reach the inner annular disc periphery, flowing under the influence of gravity, when particular disc elements are on the upper parts of their rotational paths, and thence fall in the form of veils down into the bath of flowable material below. This action considerably improves and accelerates reactions, for example the polycondensation of prepolymers to polyesters of high molecular weight.

The annular discs of the invention may advantageously be perforated or lattice-like for improved mixing. Imperforate sheet material may, however, also be used in constructing certain discs. The construction material of the discs may be of metal or some other material suitable for handling the particular flowable material being worked with.

Especially advantageous are embodiments of the invention in which the holes or lattice interstices of discs at one end of the apparatus are larger than those at the other. This enables optimum design and process control for a flowable material whose viscosity is changing during the course of its movement through the apparatus.

Likewise advantageous to the same end of accounting for changing viscosity is an arranging of the annular discs at different distances from one another. Normally most advantageous here is a spacing of the discs closer to one another at one end of the apparatus than at the other.

The moving and forwarding apparatus of the present invention can be set in a normal pot. The apparatus provides with its rotation a circulating of the flowable material in the pot and a process can run its course. It is advantageous to make the gap between the outer peripheries of the annular discs and the bottom of a reactor housing small by forming the bottom of the housing as a cylinder half substantially coaxial with the axis of rotation of the discs.

Continuous operation can be used, with a charging of starting material or an inlet end and a removal of material forwarded by the agitating and forwarding apparatus, and mixed and reacted during the course of such forwarding, at an outlet end. The reactor housing is cylindrical at least in the lower part which is continually contacted or wetted by the material being treated; this is where the gap between the outer peripheries of the annular discs and the housing is smallest.

In general, housings of the closed type are advantageous in the present invention. Then, connections for the provision of heat, pressure, vacuum, etc., can be provided. This type of construction is advantageously combined with another embodiment of the invention where the moving and forwarding apparatus is mounted eccentrically in a cylindrical reactor housing in such a manner that the lowest points on the outer peripheries of the annular discs have the minimum separation from the inner wall of the cylindrical housing.

In an especially advantageous embodiment of the invention, a screw-shaped stripper can be provided bearing against a fixed opposing surface on the end wall on the outlet side of the reactor housing. With the rotation of the moving and forwarding apparatus, this stripper continually removes material, which has been forwarded to the outlet end, from the end wall opposing surface. The last annular disc in this embodiment is preferably provided as the only annular disc which lacks a tilt; thus it is perpendicular to the rotational axis.

As already indicated above, the annular discs are arranged with different inclinations, for instance between 2° and 20°. This can be utilized to obtain a matching of the apparatus to the change in viscosity of the flowable material over the length of the apparatus for obtaining a desired forwarding velocity. Especially advantageous is an arrangement in which the annular discs are more strongly inclined at one end of the mixing and forwarding apparatus than at the other. The degree of inclination is preferably changed always in one sense; thus from disc to disc always a stronger inclination, or else weaker.

In the various embodiments of the present invention the carrier of the discoidal members is preferably constructed in the form of a cage including an end disc at the inlet end of the reactor housing, the stripper at the outlet end, and a number of longitudinal stringers. Stub-shafts are attached, one to the end disc at the inlet end, a second to the stripper at the outlet end. The individual annular discs lying between that at the inlet and the stripper are connected at their peripheries to the longitudinal stringers.

For the further improvement and acceleration of reactions by film formation, that is by intensive surface forming, and mixing in the material to be reacted, another embodiment of the invention provides scoop elements mounted on the annular discs for scooping up small amounts of the flowable material during rotation of the forwarding apparatus. After about one-half revolution, these scoop elements empty to strengthen the film and streak formation. To the same end and for improved mixing, the longitudinal stringers can be given appropriate profiles for performing a scooping function; additionally, inclined leaves can be attached to the peripheries of the annular discs.

The agitating, or mixing, and forwarding apparatus of the present invention has an especially simple construction and exhibits great stability at relatively small weight. The annular discs can be themselves light and simply constructed, because of their securement at many locations on their peripheries. Yet, there need be no worry about changed inclinations. Welding can be used to attach the discs to the stringers.

In the case of high viscosity fluids, it has been found that the present invention gives improved possibilities for controlling the parameters essential for reaction, as compared with known forwarding screws. Among such parameters are the agitation of the material, the material flow in the reactor housing, the furnishing of surface in the material, and the consistency of the material in the reactor. Moreover, it is furthermore to be noted that the inclination of the annular discs causes an improved shearing of the material and improved heat transfer from the heating medium to the material to be treated. An especially important result attributable to the inclination of the annular discs is that the film continually formed from the flowable material flows continually through the openings of the annular surfaces and prevents a remaining of viscous material on individual disc surfaces.

BRIEF DESCRIPTION OF THE DRAWINGS

FIG. 1 is a side view of an apparatus according to the invention, with housing sectioned to show the interior.

FIG. 2 is a sectional view from the line 2—2 of FIG. 1.

FIG. 3 is an elevational view of a perforated annular disc.

FIG. 3a is a side view of the disc of FIG. 3.

FIG. 4 is an elevational view of an annular disc having a variety of scooping elements.

FIG. 4a is a side view of the disc of FIG. 4.

FIG. 5 is an elevational view of a disc having a lattice construction.

FIG. 6 is an elevational view of a disc with inclined sheets on its periphery.

FIG. 6a is a side view of the disc of FIG. 6.

FIG. 7 is an elevational view of a disc having stringers built in the form of cylindrical surface elements.

FIG. 7a is a side view of the disc of FIG. 7.

DESCRIPTION OF THE PREFERRED EMBODIMENTS

Figure 8:
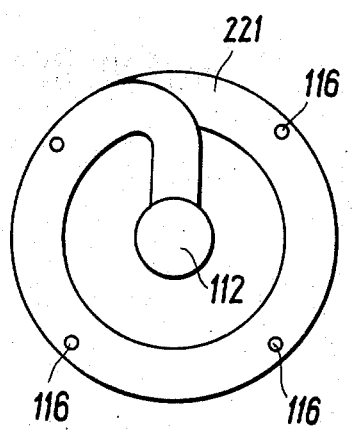
FIG. 8 is an elevational view of the stripper.

Referring now particularly to the drawings, and first to FIGS. 1 and 2, there is shown a generally cylindrically closed reaction vessel 20 having an inlet 22 through which flowable material 23 (e.g., a viscous, incompletely polymerized molten polyethylene terephthalate) is introduced and an outlet 24 through which the material is discharged. The material is propelled from the inlet 22, to and through the outlet 24, and mixed and agitated and subjected to large surface exposure en route by means of a rotary propulsion structure 26, to be described more fully hereinbelow. The vessel 20 is of a conventional heat-jacketted double-wall construction, having an interior side wall 28 and interior end walls 30, 32 for confining the material to be processed, and an outer side wall 34 and outer end walls 36, 38 which define, with the interior walls 28, 30, 32, a heat transfer jacket space 40 into which a heating or cooling medium may be introduced to heat or cool the process material 23. A vapor or gas connection 50 is provided to the interior of the upper portion of the vessel 20 for the removal or introduction of gases or vapors, e.g., in the case where polyethylene terephthalate is being polymerized, the removal in the direction of arrow R in FIG. 2 of the glycol and/or water vapors evolved.

The agitating and propulsion apparatus 26 includes annular discs 220 to 220s, which are affixed on a rotatable carrier. The carrier includes two coaxial end stub-shafts 110 and 112 connected to one another through a cage structure. The end disc 220 and the stripper 221 are welded to the stub shafts 110 and 112 and to the longitudinal stringers 116. Annular discs 220a and 220s are supported by the cage structure, the longitudinal stringers 116 being welded to, and piercing through, the annular discs 220a to 220s at their peripheries.

The agitating, or mixing, and forwarding apparatus is rotated by means, not shown, in the counterclockwise direction as indicated in FIG. 2. Each annular disc 220 to 220r is inclined slightly away from normal to the rotational axis. This can be clearly recognized from annular disc 220c, the normal to the plane of which is parallel to the plane of FIG. 1. The angle of inclination is indicated as angle α in FIG. 1 for disc 220c. This is the same as the angle between the normal to the plane of disc 220c and the axis of rotation. On the peripheries of the annular discs 220 and 220s are trailing points 56, which are in every case the points of the discs closest to stub shaft 110. The trailing point of disc 220c is the uppermost peripheral point as seen in FIG. 1. The inclination of disc 220d, while still equalling α, is different from that of 220c in such a manner that the trailing point of disc 220d is shifted 45° from that of disc 220c (in the clockwise direction, as seen looking from the left toward the right in FIG. 1, along the rotational axis). Correspondingly, the trailing point of disc 220e is shifted 45° from that of disc 220d, likewise in the clockwise direction, seen as above. This behavior is continued on across FIG. 1, from left to right. It thus results that the trailing points 56 of all the annular discs 220 to 220r lie on a helicoidal line.

It has been found empirically that such a studied inclining of discoidal elements will, when the discs are rotated about their rotational axis, effect a propulsion of flowable materials engaged thereby in a direction parallel to the axis of rotation and in the same direction as would a worm screw having the same direction of rotation and the same sense as the helicoidal line of the trailing points. This is true, notwithstanding the fact that a single tilted disc, or an array of tilted discs in which the trailing points are not helicoidally arranged, will not give any net propulsive effect, but will merely move the material to and fro.

Disc 220s, the last disc, is arranged perpendicularly to the axis of rotation.

As can be seen from FIG. 1, the construction of the individual annular discs, which have a continuous and unobstructed central opening is quite simple and uncomplicated as compared with the helicoidal screw worms heretofore employed.

As shown in FIG. 2, the gap between the outer peripheries of the annular discs and the bottom of the reactor housing is made small in that wall 28 is provided in the form of a cylinder substantially coaxial with the axis of rotation of the discs. Furthermore, a slight eccentricity is provided between the axis of the cylinder and the axis of rotation, so that there is a minimum gap at the lowest points in the discs and cylindrical wall 28.

The perforate annular disc 220z, as shown in FIG. 3, can be used in place of the annular discs 220 to 220s of FIG. 1. The disc 220z is constructed from a flat annular sheet provided with a plurality of holes 223. This annular disc is, as can be seen in FIG. 3a, connected in the region of its periphery with the longitudinal stringers 116. The stringers pierce through the disc and the locations of contact between the disc and the stringers contain welds. Large holes 223 may be provided in place of holes 223, depending on where along the axis the disc is to be mounted.

The annular disc 220y illustrated in FIG. 4 carries a number of different embodiments of scoop elements connected to the face of the disc. The scoop elements 224 have a zig-zag or wave shape and are generally radially directed. One immersion during rotation of the disc, a quantity of viscous flowable material is lifted by these scoops 224. The material in these scoops 224 reaches the inner periphery of the disc later in time as compared to the flowable material simply clinging to the surface of the disc. The material then falls from the inner pheriphery in veil or film form. Scoop elements 225, which work in the same manner, are made of angle-iron or the like and form troughs open to the direction of rotation of the disc. These troughs are closed on one end by the surface of the annular disc and on the other by a special end piece (see FIG. 4a). Also shown in FIGS. 4 and 4a is a longitudinal stringer 117 provided with a U-shape cross section for reinforcing the streak-flow of the flowable material on the annular disc and for reinforcing the formation of veil or film formation at the inner periphery of the disc, in the manner of scoop elements 225.

FIG. 5 illustrates an annular disc 220x having a lattice 66a built from strips 66.

In FIGS. 6 and 6a there are illustrated leaves 226 inclined to the plane of the annular disc 220w. One of the leaves appears end on in FIG. 6a. The attachment of these leaves on the outer periphery of the disc provides for improved mixing and kneading of the flowable material.

A further embodiment for the longitudinal stringers in the cage structure of the mixing and forwarding apparatus of the invention is illustrated in FIGS. 7 and 7a. The longitudinal stringers are provided in the form of sections 118 of a cylinder. These sections are provided with a plurality of perforations 119 and are fastened directly on the outer periphery of the annular discs 220v. This type of stringer likewise improves and strengthens film and streak formation and the mixing and dividing of the flowable material.

FIGS. 1 and 8 show the screw-shaped stripper 221, which is fastened by welding with the stub shaft 112 and with the longitudinal stringers 116. The radial part of the stripper 221 runs in a plane perpendicular to the rotational axis and consequently moves past the fixed opposing surface 222 during each rotation to clear this surface 222 of adhering material.

Figure 9:
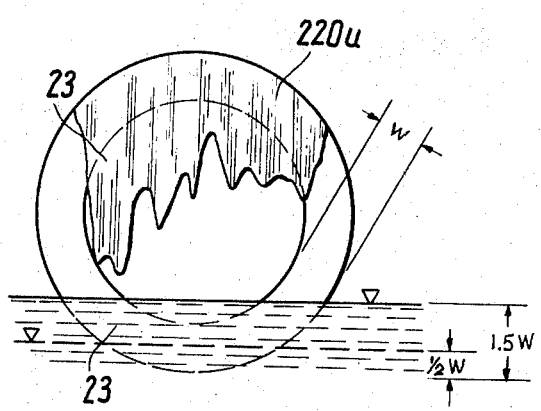
FIG. 9 is an elevational view of a rotating annular disc immersed in flowable material.

FIG. 9 shows flowable material 23 falling as a film or veil from an annular disc 220u. It is preferred to match the parameters of the viscosity of the flowable material, the particular annular disc structure, the annular width w of the annular disc, the level of the flowable material in the reactor housing, and the rotational speed of the annular disc, such that a maximum amount of the flowable material lifted clinging to the disc surface falls from the inner disc periphery in a film. Levels of the flowable material are indicated in FIG. 9 by the small triangles. A minimum level for the flowable material lies at about one-half the annular width w of the annular disc. It is preferred for optimum results that the level lie at from 1.0 to 1.5 times the annular width w.

The mixing and forwarding apparatus 26 of the present invention acts to move an entire charge of flowable material to the right wall of the reactor vessel 20 in FIG. 1. Thus, a maximum length is available for working a charge. Furthermore, a part of a charge always clings to the annular discs and is thus lifted by the rotation of the discs out of the mass of material on the floor of a reactor to provide increased surface for surface-controlled phenomena. While planar, smooth annular discs are adequate for the present invention, the effect of the apparatus is much greater when the annular discs are perforate discs, for example annular discs having sieve-like parts, those made of perforate plate, and those made of metal strips arranged in a lattice-work, and when the annular discs are provided with scooping elements.

The axial separations betweeen the discs 220 to 220s do not need to be the same. They can be made different as required. Likewise, the helicoidal line need not be continuous. In any event, however, it must be made certain that the angular displacement of the trailing point in proceeding from disc to disc is always in one sense about the rotational axis. Otherwise, the particular geometrical relationships can be chosen freely to adapt the apparatus of the present invention to the working of any particular flowable material. This is advantageous, for instance, in the case of a material which changes its properties with progressive movement through the reactor vessel. An example is polyethylene terephthalate, whose viscosity increases as its polycondensation increases.

The angle at which each annular disc is inclined with respect to the normal directions to the shaft axis can be chosen within wide limits as a function of the properties of the material to be worked. For example, inclinations of the discs from 1.5° to 45° has proven effective, the preferred range being from 2° to 20°. The angle of inclination does not have to be the same for all discs; thus, it has, for example, been found to be advantageous for an apparatus effecting the final polycondensation of polyethylene terephthalate to increase the angle of inclination of the discs arranged along the axis progressively from about 2° at the inlet end to 7° at the outlet end.

Figure 10:
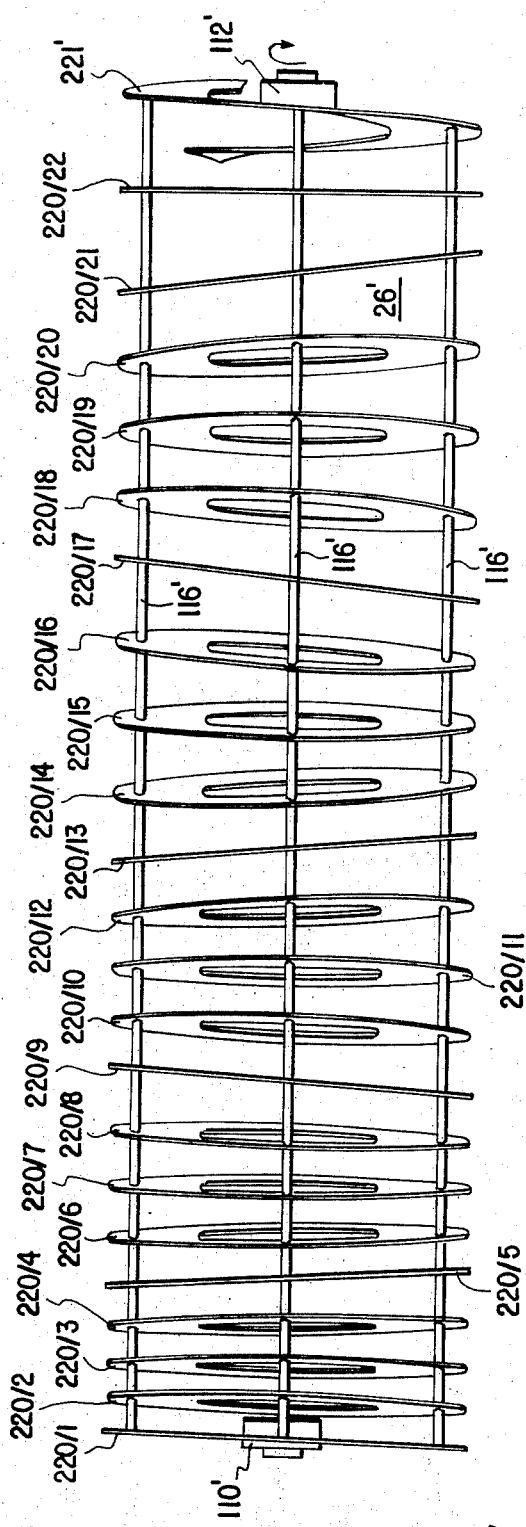
FIG. 10 is a view as in FIG. 1 of a modified portion of the structure appearing in FIG. 1.

FIG. 10 shows a modified portion of FIG. 1, namely rotary agitating and propulsion structure 26', which can be installed into a reaction vessel 20 of the type shown in FIG. 1. This structure 26' is built up of two stub-shafts 110' and 112', the longitudinal stringers 116', twenty-one inclined discs 220/1 to 220/21, a non-inclined disc 220/22, and a stripper 221'. Disc 220/1 is inclined 2° from vertical, with each of the following discs being inclined 0.25° more, disc 220/21 thus being inclined at 7° from vertical. The second disc, disc 220/2, is spaced at the axis a distance of 8 centimeters from the first disc, disc 220/1, the third disc from the second a distance of 8.5 centimeters, and so on, the twenty-first disc thus being spaced 17.5 centimeters from the twentieth disc.

Further illustrative of the invention is the following example:

EXAMPLE

A prepolymer of polyethylene terephthalate having a viscosity of 20,000 centipoise was introduced into the apparatus of FIG. 1 as modified in FIG. 10. Pressure and temperature in the apparatus were as follows: 0.5 mm Hg; 295°C. The annular width of the discs was 20 cm; their outer diameter 80 cm. The angle of inclination of the disc at the left of FIG. 10 was 2°, with the angle of inclination of the last inclined disc at the right of the Figure being 7°, the change of inclination of the discs in between being uniform; that is each succeeding disc was tilted by $2°+5°(x-1/20)$, where $x$ = consecutive number of inclined disc
= 1, 2, . . . 21.

The axial separations of the discs also changed from left to right in FIG. 10, from 8 cm to 17.5 cm, the change being uniform, that is each disc was separated from the preceding one by $8cm + 0.5(x-2)$ cm, where $x = 2, 3, \ldots 21$ (disc one has no preceding one). Additionally, diameters of perforations (not shown in FIG. 10; see FIG. 3) in the disc surfaces changed from left to right in FIG. 10, the diameter at the left-most disc perforations being 2cm, that of the right-most disc perforations being 10cm, the change of diameter from disc to disc being uniform, the total area of perforations in all the discs from the left-most disc to the right-most disc being 1880cm$^2$, without change in total area from disc to disc. The apparatus was operated at a rotational speed of 10 revolutions per minute and with an immersion depth equal to 1.25 times the annular width of the discs, that is 25cm maximum. The viscosity of the polyethylene terephthalate leaving the outlet of the apparatus was 180,000 centipoise; the polymer-output was 1800 kg/h.

Using the apparatus of U.S. Pat. No. 3,684,458, prejudicial irregularities in polymer spinning can arise due to the presence of remnants of formerly reacted material in the mass to be treated. These remnants deposit particularly on parts of the moving and propulsion means in the course of several days or weeks, and loosen in an uncontrolled way and join the mass in the reactor. Owing to the annular form of the discs according to the invention, where all the parts are touched by the mass to be treated, such remnants, unwanted gelation, and cracking of the polymer does not occur. Even after 6 months of continuous operation, a deterioration of the material to be spun is not observed.

The term "mixing" as used herein is meant to include the mixing together of two or more substances. It is also meant to include the homogenizing of a single substance which is undergoing chemical changes such as in the production of polyester.

It will be understood that the above description of the present invention is susceptible to various modifica-

We claim:

1. In an apparatus for mixing and forwarding a flowable material comprising: a carrier arranged to rotate about an axis, one end of which axis will hereinafter be designated the "reference" end; and a plurality of discs disposed along the axis of said carrier and secured to said carrier to rotate therewith, the center of each disc being substantially at said axis, each of said discs being inclined away from normality to said axis, so that one point, hereinafter designated the "trailing point" on the periphery of each disc is closer than any other point on that disc to the reference end of said axis; the trailing points of the successive discs being disposed along a helicoidal line substantially coaxial with said axis; said carrier comprising two stub-shafts, one at each end of said carrier and disposed coaxially of each other, and a cage structure embracing said discs, attached to said stub shafts and also attached to said discs near the peripheries thereof;

the improvement wherein each one of said discs is of flat, annular configuration defining a continuous unobstructed central circular opening, said cage structure embracing said discs extends externally of said circular opening.

2. In an apparatus as claimed in claim 1, the further improvement that said discs are perforate discs.

3. In an apparatus as claimed in claim 1, the further improvement that said discs are lattice discs.

4. In an apparatus as claimed in claim 1, the further improvement that said discs are provided with holes or interstices larger at one end of said axis than at the other.

5. In an apparatus as claimed in claim 1, the further improvement that said discs are arranged with different axial separations from one another.

6. In an apparatus as claimed in claim 5, the further improvement that the discs at one end of the axis are arranged with smaller axial separations than at the other end of the axis.

7. In an apparatus as claimed in claim 1, the further improvement that said discs are arranged with different inclinations from the normals to said axis.

8. In an apparatus as claimed in claim 7, the further improvement that said discs are inclined at larger angles at one end of said axis than at the other end.

9. In an apparatus as claimed in claim 1, the further improvement comprising means for scooping flowable material during rotation of said discs about said axis and for thence emptying.

10. In an apparatus as claimed in claim 1, the further improvement that said cage structure includes stringers attached to said discs near the peripheries thereof, said stringers being shaped as means for scooping flowable material during rotation of said discs and for thence emptying.

11. In an apparatus as claimed in claim 1, the further improvement comprising leaves on the outer peripheries of said discs, said leaves are inclined to the plane of said discs.

12. In an apparatus as claimed in claim 1, the further improvement that said cage structure includes stringers attached to said discs near the peripheries thereof, said stringers being in the form of sections of a cylinder.

13. In an apparatus for mixing and forwarding a flowable material comprising: a vessel having an inlet for receiving said material and an outlet, spaced from said inlet, for discharging said material; a carrier disposed in said vessel and arranged to rotate about an axis extending generally in a direction from said inlet to said outlet, one end of which axis will hereinafter be designated the "reference" end; and a plurality of discs disposed along the axis of said carrier and secured to said carrier to rotate therewith, the center of each disc being substantially at said axis, each of said discs being inclined away from normality to said axis, so that one point, hereinafter designated the "trailing point", on the periphery of each disc is closer than any other point on that disc to the reference end of said axis; the trailing points of the successive discs being disposed along a helicoidal line substantially coaxial with said axis; said carrier comprising two stub-shafts, one at each end of said carrier, and disposed coaxially of each other, and a cage structure embracing said discs, attached to said stub-shafts and also attached to said discs near the peripheries thereof;

the improvement wherein each of said discs is of flat annular configuration defining a continuous unobstructed central circular opening, said cage structure embracing said discs extends externally of said circular opening.

14. In an apparatus as claimed in claim 13, the further improvement that the bottom of said vessel has the form of a cylinder substantially coaxial with said axis.

15. In an apparatus as claimed in claim 14, the further improvement that there is an eccentricity between said axis and the axis of said cylinder and a minimum gap between said discs and said vessel.

16. In an apparatus as claimed in claim 13, the further improvement comprising an opposing surface fixed to said vessel at said outlet and a screw-shaped stripper means fastened to said carrier for clearing flowable material from said opposing surface.

17. In an apparatus as claimed in claim 16, the further improvement comprising a disc fixed perpendicularly to said carrier at said outlet before said stripper means.

* * * * *

PO-1050
(5/69)

UNITED STATES PATENT OFFICE
CERTIFICATE OF CORRECTION

Patent No. 3,761,059  Dated September 25, 1973

Inventor(s) Horst Rothert and Wolf Karasiak

It is certified that error appears in the above-identified patent and that said Letters Patent are hereby corrected as shown below:

Col. 2, line 18
"of" (second occurrence) should be -- on --

Col. 5, line 25
"220a and 220s" should be -- 220a to 220s --

Col. 6, line 22
"Large holes 223" should be -- Large holes 233 --

Col. 6, line 29
"One" should be -- on --

Col. 8, line 25
"(x-1/20)" should be -- $\left(\frac{x-1}{20}\right)$ --

Col. 10, line 34
after the word "each" should be inserted -- one --

Signed and sealed this 16th day of April 1974.

(SEAL)
Attest:

EDWARD M. FLETCHER, JR.
Attesting Officer

C. MARSHALL DANN
Commissioner of Patents